United States Patent

[11] 3,627,430

| [72] | Inventor | Walter Miller<br>Traunstein, Germany |
|---|---|---|
| [21] | Appl. No. | 829,182 |
| [22] | Filed | June 2, 1969 |
| [45] | Patented | Dec. 14, 1971 |
| [73] | Assignee | Dr. Johannes Heidenhain<br>Traunreut nr. Traunstein, Germany |
| [32] | Priority | May 30, 1968 |
| [33] | | Germany |
| [31] | | P 17 73 529.4 |

[54] OPTICAL MEASURING DEVICE
5 Claims, 11 Drawing Figs.

[52] U.S. Cl. .................................................. 356/170,
350/116
[51] Int. Cl. ..................................................... G01b 11/04,
G02b 27/02
[50] Field of Search ........................................... 356/170,
350/110–116

[56] References Cited
UNITED STATES PATENTS

| 2,797,614 | 7/1957 | Heidenhain ................ | 350/160 |
| 3,109,048 | 10/1963 | Rantsch et al. ............ | 356/170 X |
| 3,134,838 | 5/1964 | Rantsch et al. ............ | 356/170 |
| 3,363,963 | 1/1968 | Smith et al. ................. | 350/112 |
| 2,071,676 | 2/1937 | Williams ..................... | 350/114 |

*Primary Examiner*—Ronald L. Wibert
*Assistant Examiner*—T. Major
*Attorney*—Ernest G. Montague ABSTRACT: An optical measurement device including a scale and a reading device for measuring and setting of lengths or angles, which comprise means for projecting a section of a scale enlarged into a reading field of a reading device. The scale is formed in its total range to be read in the manner of a transverse measuring field including FIGS. The FIGS. have straight-lined limiting margins and are dark at least at their edges, and are set off relative to each other. Each of the FIGS. of the transverse measuring field provided on the scale is numbered, for a numerical indication of the measuring values. A fork is disposed in the reading field of the device for the symmetry equalization and has limit edges disposed parallel to the straight-lined FIGS. of the transverse measuring field, and passes through within the range of the figure images disposed in or crosswise to the direction of displacement of said fork. A numbered figure image of the transverse measuring field is caught by the fork, and means are provided for measurably displacing the fork for division of the intervals of the transverse measuring field.

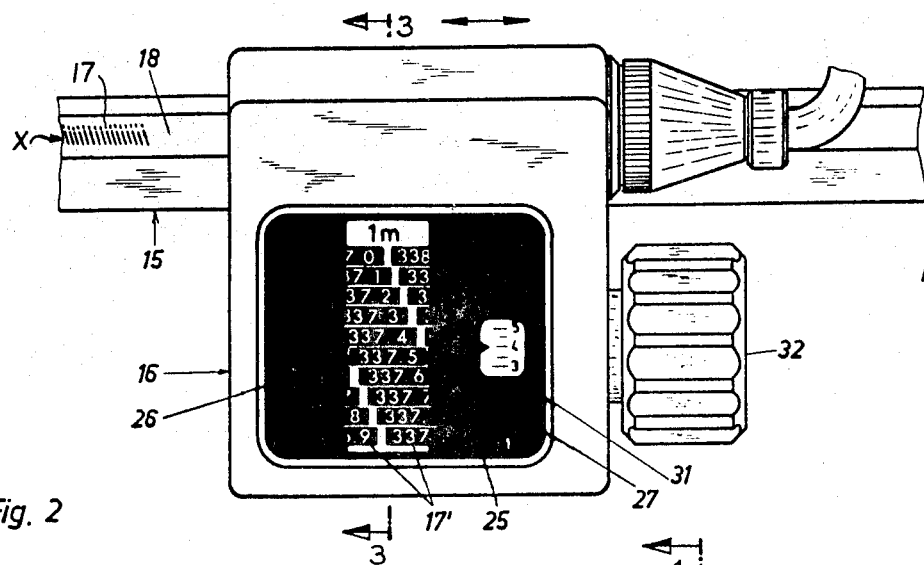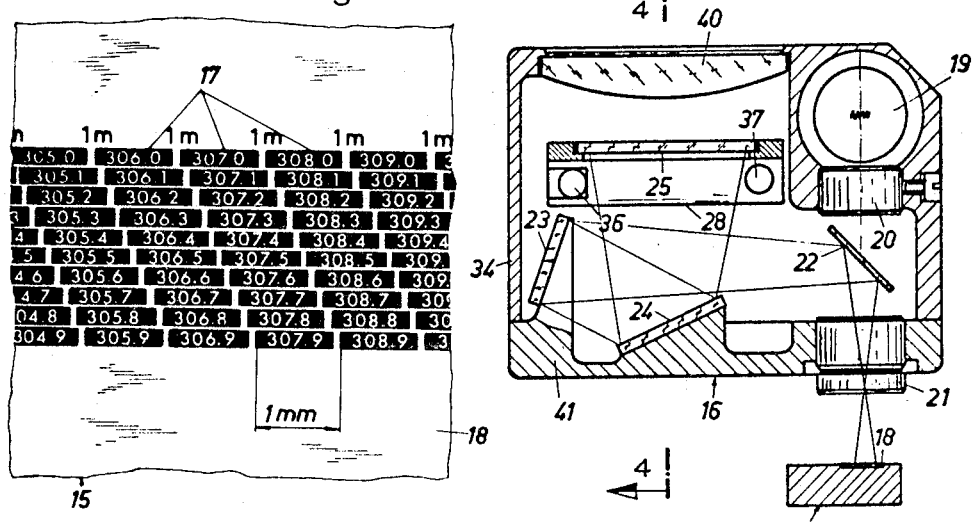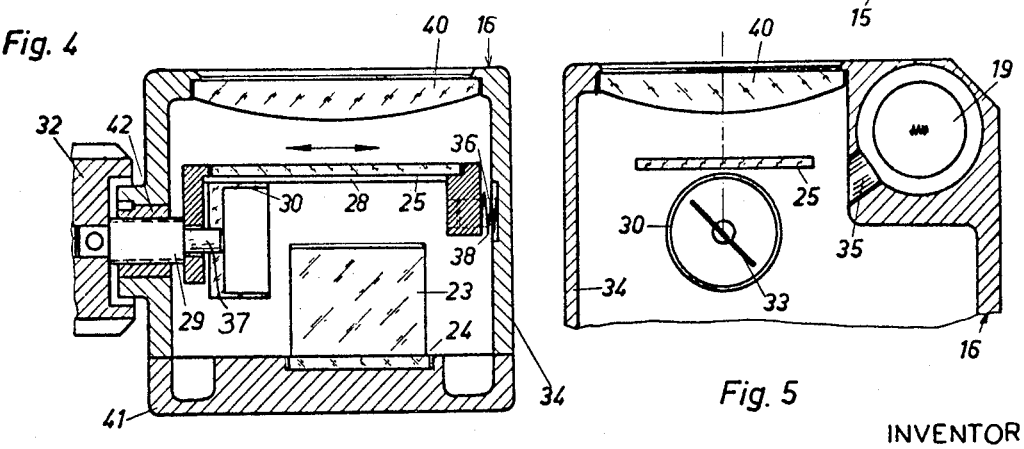

Inventor
WALTER MILLER

By

Attorney

Inventor
WALTER MILLER

Inventor
WALTER MILLER

OPTICAL MEASURING DEVICE

The present invention relates to an optical measurement device, in general, and to such measurement device comprising an optical arrangement including a scale and reading device for measuring and setting of lengths or angles, in which a section of the scale containing the prevailing measuring value is projected enlarged into the reading field of the device, in particular.

Measurement devices are known in which the division carrier is formed in its entire reading range in the manner of a transverse measuring field, whereby for the numerical reading of the measuring value each individual figure of the transverse measuring field is numbered. The figures of the transverse measuring field are in this arrangement numbered circular rings, which are read by means of a pointer, which is displaceable along the transverse measuring field. The pointer has a plurality of holes disposed crosswise to its displacement direction and arranged on top of each other, which are provided relative to each other at equal distances as the circular rings of the transverse measuring field and the diameter of which is slightly greater than the outer diameter or the circular rings. During reading of the measuring value, one seeks that hole of the pointer in which the numbered circular ring of the transverse measuring field is disposed concentrically.

In arrangements of this type the nonorderly reading of the measuring values is a drawback, because during the reading each individual bore of the plurality of bores of the pointer must be observed. Also in this arrangement, reading and setting errors can occur, because by the formation of the figures of the transverse measuring field as circular rings, practically no correct symmetry equalization can be performed.

It is, furthermore, known in optical reading devices of a scale to provide on the movable measuring plate in the manner of a transverse measuring field relatively set-off rows of numbers, whereby the numbers corresponding with the balance position of the scale and also adjacent numbers are projected optically enlarged on a screen of the reading device. In this optical reading device, the height of the screen is equal with the height of the number images, so that the number, which is disposed between the margins of the screen, indicates the weight of the scale load. In this arrangement, though, contrary to the first described arrangement, a passing through catching fork is provided for the numbers; however, here again, no correct symmetry equalization can be provided, because the eye cannot observe univocally, whether the number is actually disposed symmetrically between the edges of the screen. In the symmetry equalization, it is known to set on equality the light slot resulting between the object to be set and the catching fork. This requires, however, sharp straight linear limit edges on the catching fork, as well as on the object to be set. Rows of numbers, to which they are set in the known case, have, however, not the straight-lined limit edges required for the symmetry equalization, so that, upon use of the same setting errors can occur.

In a further known optical measuring device, the screen is equipped with a transverse measuring field on which the graduation to be read in numbers of the scale is imaged. The figures of the transverse measuring field, which limit the intermediate space serving for a symmetry equalization are here rows of dark rectangles, of which only the outermost rows are numbered. In spite of the fact that in this measuring arrangement based on the rectangular shaped formation of the figures of the transverse measuring field contrary to the above-mentioned arrangements, a nonobjectional setting or reading of the measuring values is assured; still the nonorderly reading of the transverse measuring field provided on the screen has been shown as being a drawback. Also it is already known in this arrangement, to displace measurably the catching fork used for the symmetry equalization, which is designed thereby as rectangularly shaped figures of the transverse measuring field, so that in this arrangement, contrary to the above-mentioned known measuring arrangements, also a further subdivision of the intervals of the transverse measuring fields can be obtained.

It is one object of the present invention to provide an optical measurement device, wherein the drawbacks of known measuring arrangements are omitted and in an arrangement of the above-stated type to create with simple means an orderly, as well as extensively error-free setting or reading of the measuring values. Beyond that, it is also an object of the present invention, to provide an optical measurement device which is universally applicable and thereby a very fine subdivision of the length to be measured is assured.

It is still another object of the present invention to provide an optical measurement device, which comprises an optical arrangement for measuring and setting of lengths by the combination of the following features:

a. The scale is in its entire range to be read formed in the manner of a transverse measuring field, the figures of which have straight-lined limit edges and are dark at least at their edges, whereby for the number indication of the measuring values, each of the figures set off relative to each other of the transverse measuring field provided on the scale is numbered;

b. In the reading field of the device, a fork is provided with limit edges arranged parallel to the straight-lined figures of the transverse measuring field and passing through within the range of the figure images disposed crosswise to the displacement direction of the fork, by means of which limit edges a numbered figure image of the transverse measuring field is caught for a symmetry equalization;

c. The fork is measurably displaceable for the division of the intervals of the transverse measuring field.

With these and other objects in view which will become apparent in the following detailed description, the present invention, which is shown by example only, will be clearly understood in connection with the accompanying drawings, in which:

FIG. 1 is an elevation of a first embodiment of the measurement device of the present invention;

FIG. 2 is a section X of FIG. 1, shown at an enlarged scale;

FIG. 3 is a section along the lines 3—3 of FIG. 1;

FIG. 4 is a section along the lines 4—4 of FIG. 3;

FIG. 5 is a fragmentary section of the device disclosed in FIGS. 3 and 4 indicating the illumination of the drum used for the fine division;

Figure 6:
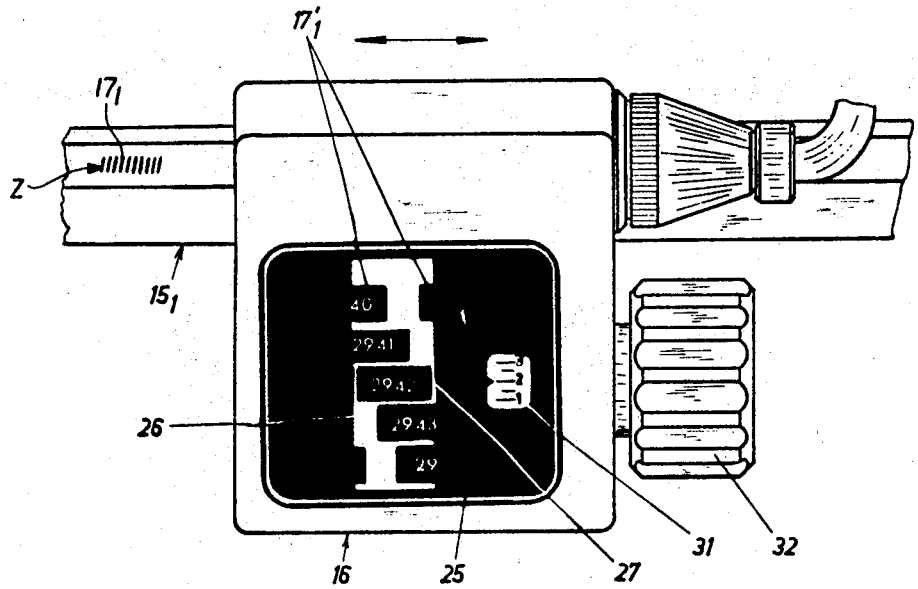
FIG. 6 is a schematic elevation of the device designed in accordance with the present invention and shown in FIG. 1, however, set for reading of inch divisions.

Referring now to the drawings, and in particular to FIGS. 1–5, the optical measuring device comprises a scale 15 and a reading device 16, wherein the scale 15 is formed in accordance with the present invention in its entire reading range as transverse measuring field, the figures 17 of which are numbered. In FIGS. 1 and 2, the figures 17 are, for example, dark rectangles, which are provided on a light-reflecting base. The numbers of the transverse measuring field are thereby recesses in the dark figures 17. The figures 17 of the transverse measuring field can, in known manner, be produced, for instance, by blackening of a polished steel band 18 or also by vaporizing of a dark number forming layer on the reflecting carrier body or by application of a light reflecting layer on a light absorbing base.

A secton containing the measuring value 15 of the transverse measuring field is illuminated by means of a light source 19 and a condenser 20 and projected by means of an objective 21 over a permeable deflection mirror 22, as well as full mirrors 23 and 24 enlarged to a screen 25, which is formed simultaneously as an indicator fork for the dark figure images 17' of the transverse measuring field. The distance between the passing through straight-lined limiting edges 26 and 27 of the fork 25 is slightly greater than the distance between the limiting edges of the figure images 17' extending crosswise to the displacement direction of the fork 25, so that during setting and reading of the measuring values one of the dark figure images 17' can be set symmetrically between the edges 26 and 27 of the fork 25, limiting the light face range. The fork 25 is inserted in FIG. 4 into a frame 28, which frame 28 is measurably displaceable by means of a threaded spindle 29. Upon rotation of the knob 32, which is pinned at a threaded spindle 29, the fork 25 can be displaced within the range of an optically enlarged division interval of the transverse measuring field provided on the scale 15. For measuring of the displacement path of the fork 25, a numbered measuring drum 30 rotatable with the threaded spindle 29 is provided, which can be read on a recess 31 (FIG. 1) provided in the dark face range of the fork 25.

Instead of the numbering of the measuring drum 30, shown in the drawing, for instance, also a numbering can be applied which is similar to the arrangement of the number fields of the scale 15, in which a plurality of number fields staggered relative to each other run through the reading window. The transparent measuring drum 30 is also illuminated over a mirror 33 through the light source 19. A breakthrough 35 in a housing 34 directs the light bundle of the lamp 19 to the deflection mirror 33. The deflection mirror 33 is in FIG. 5 secured to the housing 34 of the reading device 16, in a manner not shown in the drawing.

The frame 28 carrying the screen 25 is guided by means of two pins 36 and 37, as indicated in FIGS. 3 and 4, which pins 36 and 37 engage in recesses of the frame 28 and are immovably secured at the other end in the housing 34 of the reading device 16. Springs 38 provided on the pins 36 and 37 bring about, that the frame 28 is always pressed against the setting face of the threaded spindle 29. The screen 25 is read by means of a reading lens 40, which closes sealingly the housing 34 of the reading device 16. The other opening of the housing 34 is closed up by means of a cover 41 in the embodiment shown in the drawings, which is a carrier for the mirrors 23 and 24, as well as for the objective 21.

During reading of the measuring value, by rotation of the knob 32 the fork 25 is displaced so far, until one of the dark figure images 17' of the transverse measuring field is disposed symmetrically between the limit edges 26 and 27 of the fork 25. For instance, in FIG. 1, the set millimeter and tenths of a millimeter can be read in the forked figure image 17', while on the reading field 31 of the fork 25, the hundredths of a millimeter can be read in numbers. In FIG. 1, for instance, the measuring value to be read amounts to 1 meter and 337.54 millimeters.

Figure 7:
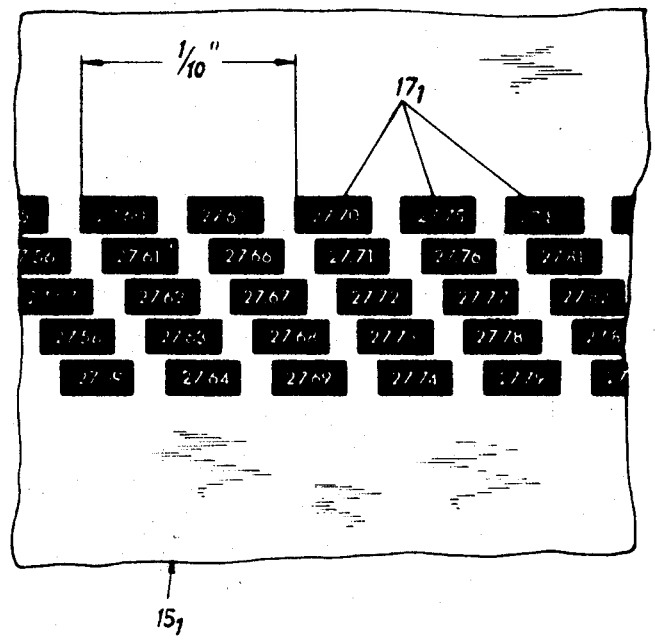
FIG. 7 is an enlarged section "Z" of FIG. 6.

Referring now again to the drawings, and in particular to FIGS. 6 and 7, the optical reading device 16 for reading of scales $15_1$ with an inch scale is shown. The scale $15_1$ is, as formed in FIGS. 1 and 2 in its entire reading range as transverse measuring field, the dark figures $17_1$ of which are numbered. If the reading device 16 shown in FIG. 1 should be used also for reading of inch-divisions or scales, as it is the case in FIG. 6, then the spindle 29 shown in FIG. 4 (including its nut 42) must be replaced by another threaded spindle with a pitch suitable for inch-divisions. The present invention is, of course, not limited to an arrangement, wherein for displacement of the fork 25 a threaded spindle is used, rather it is, for instance, also possible to replace the same by a cam disc.

During reading of the measuring value in FIG. 6 the fork 25 is displaced so far until one of the figure images $17'_1$ is disposed symmetrically between the limit edges 26 and 27 of the fork 25. Then the measuring value can be read, which amounts in FIG. 6, for instance, to 29.422 inches.

Figure 8:
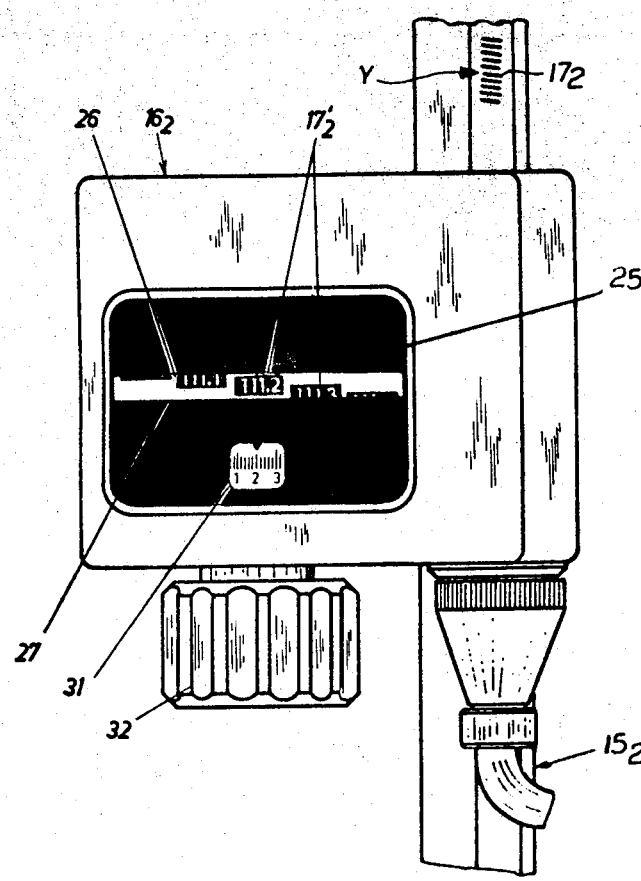
FIG. 8 is an elevation of a second embodiment of the measuring arrangement of the measurement device designed in accordance with the present invention.
Figure 9:
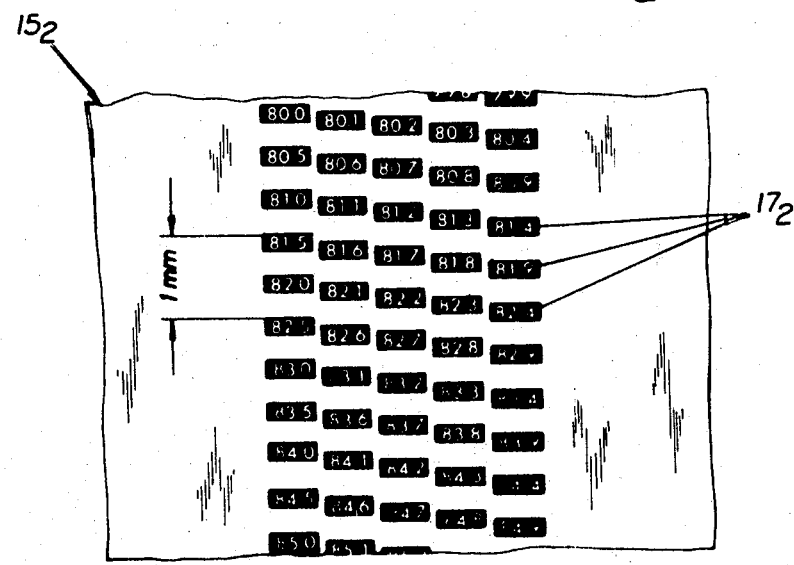
FIG. 9 is a section "Y" of FIG. 8 shown at an enlarged scale.

Referring now again to the drawings, and in particular to FIGS. 8 and 9, another measurement arrangement of the present invention comprising a scale $15_2$ and a reading device $16_2$ is shown, in which the numbering of the figures $17_2$ of the transverse measuring field, contrary to FIGS. 1 and 6, is not readably arranged crosswise to the displacement direction of the scale, rather in displacement direction of the scale $15_2$. During reading of the measuring value one of the numbered figure images $17_2'$ is set symmetrically, in the same manner as in the previous embodiment, between the limiting edges 26 and 27 of the fork $25_2'$. In FIG. 8, for instance, the measuring value 111.22 mm. is read.

Figure 10:
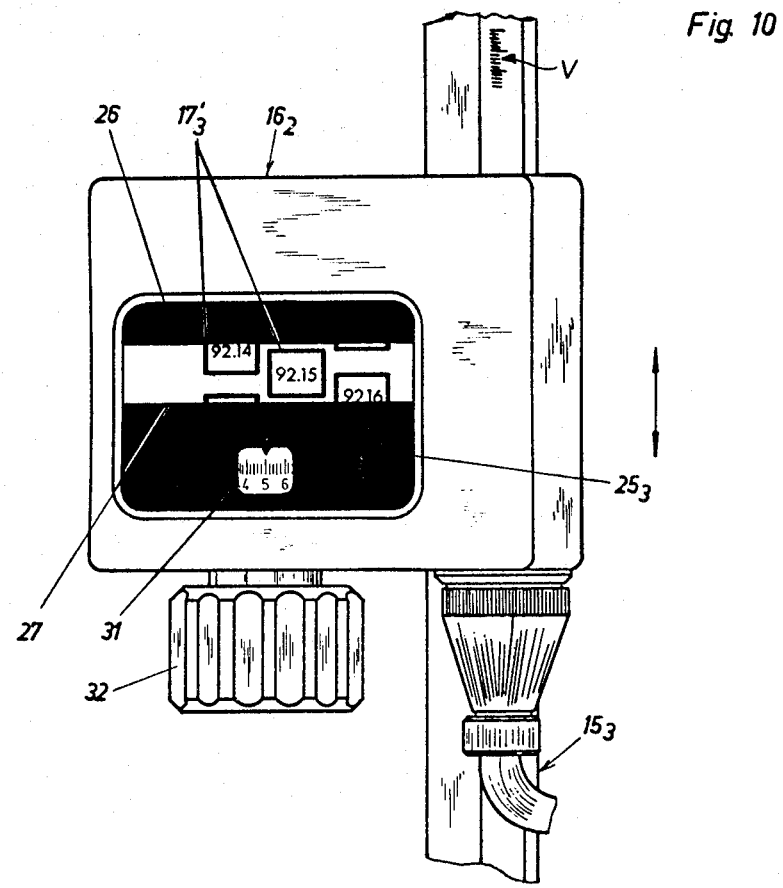
FIG. 10 is a third embodiment similar to that of FIG. 8, however, designed for the reading of an inch scale.
Figure 11:
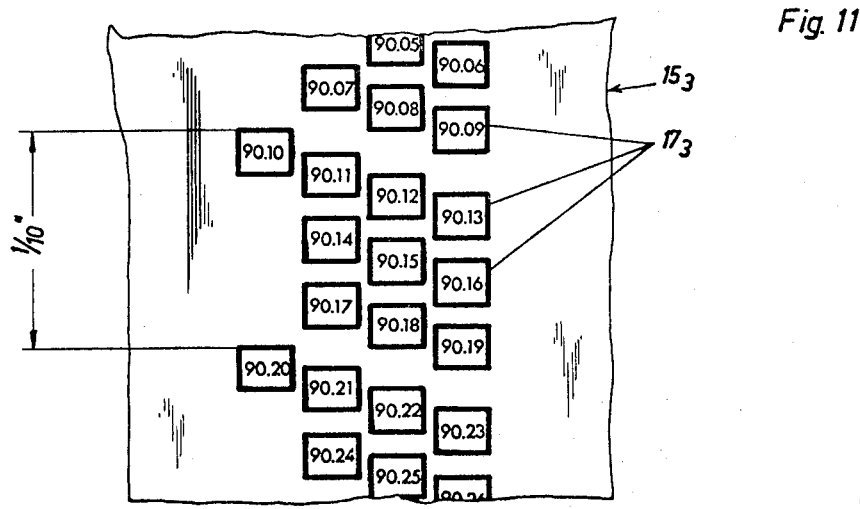
FIG. 11 is a section "V" taken from FIG. 10.

FIGS. 10 and 11 show an embodiment similar in principal to that as shown in FIG. 8, however, for reading of inch-divisions. Also in FIG. 11, the figures $17_3$ are not dark rectangles, in which the numbers are recessed, rather they are merely dark framed at their edge parts. The numbering of the figures $17_3$ of the transverse measuring field are likewise dark layers on a light-reflecting base.

During reading of the measuring value, one of the dark framed figure images $17_3'$ is set symmetrically between the limiting edges 26 and 27 of the fork $25_3$. In FIGS 10, for instance, the measuring value is 92.155 inches.

While I have disclosed several embodiments of the present invention, it is to be understood that these embodiments are given by example only and not in a limiting sense.

I claim:

1. An optical measurement device comprising
   a measuring rod and a scale continuously formed thereon along a length to be read,
   a reading device cooperatively mounted relatively movable in a direction of measuring to said measuring rod and comprising
   means for projecting a section of said scale enlarged into a reading field of said reading device,
   said scale in its total range constituting a plurality of figures forming columns substantially transverse to the direction of measurement, the figures of each column being displaced relative to each other in the measuring direction,
   said figures having straight-lined limiting margins and of equal dimension in said measuring direction and are dark at least at their edges,
   each of said figures of said transverse measuring field provided on said scale being numbered, for a numerical indication of measuring values,
   said projecting means projecting images of said numbered figures on said reading device,
   a single fork constituting a viewing field diaphragm disposed in the reading field of the reading device for symmetry equalization and including limit edges and passing through within the range of said images of said numbered figures, said limit edges having a spacing in the measuring direction only slightly larger than that of each complete individual numbered figure and defining between said limit edges the viewing field of said fork which in said measuring direction makes visible only one single complete numbered figure image being caught by said fork, and together with sections of the remaining adjacent figure images being covered by said fork, and
   means for measurably displacing said fork for subdivision of said scale.

2. The optical measurement device, as set forth in claim 1, wherein
   said figures provided on said scale comprise light-absorbing rectangles including a light-reflecting base having the numbers recessed in said base.

3. The optical measurement device, as set forth in claim 1, wherein
   said figures provided on said scale have a dark frame receiving dark numbers therein.

4. The optical measurement device, as set forth in claim 1, wherein
   said scale further includes a separate row of numbers for definition of superior measuring units.

5. The optical measurement device, as set forth in claim 1, wherein
   said figures further form a plurality of rows of said figures aligned parallel to the direction of movement of said scale.